March 18, 1969 L. C. WHITON ET AL 3,432,994
METHOD FOR EFFECTING COUNTERCURRENT CONTACTING
OF GAS AND LIQUID STREAMS
Original Filed Dec. 16, 1964

INVENTORS:
Louis C. Whiton
Alfred Arnold Petersen
BY:
James R. Hoalson Jr.
Philip T. Liggett
ATTORNEYS

United States Patent Office 3,432,994
Patented Mar. 18, 1969

3,432,994
METHOD FOR EFFECTING COUNTERCURRENT CONTACTING OF GAS AND LIQUID STREAMS
Louis C. Whiton, Westport, and Alfred Arnold Petersen, Greenwich, Conn., assignors to Universal Oil Products Company, Des Plaines, Ill., a corporation of Delaware
Original application Dec. 16, 1964, Ser. No. 418,798, now Patent No. 3,364,656, dated Jan. 23, 1968. Divided and this application Sept. 12, 1967, Ser. No. 667,120
U.S. Cl. 55—91       3 Claims
Int. Cl. B01d 47/06

ABSTRACT OF THE DISCLOSURE

Countercurrent contacting of gas and liquid streams with the use of large surface area open contact elements which will provide both exterior and interior contact surfaces and in addition can be utilized in a floating bed manner to effect the turbulence and mutual contact between gas and liquid streams in a countercurrent flow, such elements being in hollow spherical form with large wall openings.

---

Figure 1:
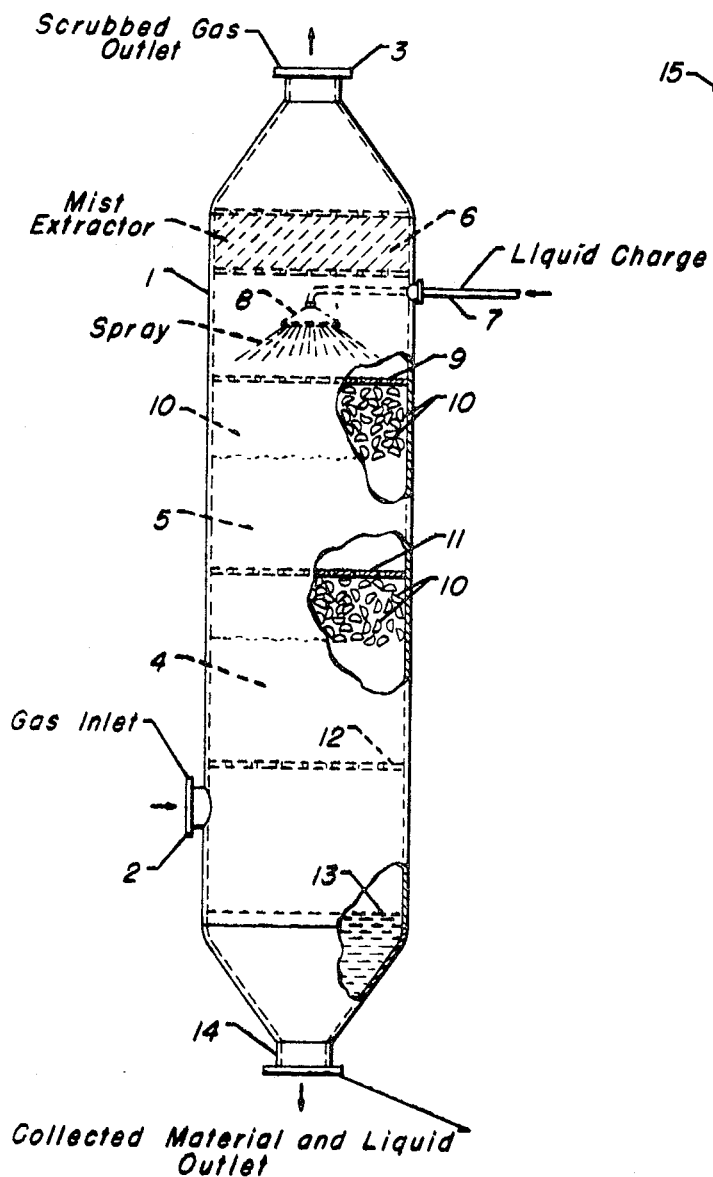

This application is a division of our present copending application, Ser. No. 418,798, filed Dec. 16, 1964 now U.S. Patent No. 3,364,656.

There are, of course, many types of towers with various forms of packing, as well as towers or columns which utilize special contacting decks or trays that may be used for the countercurrent contacting of gas and liquid streams. The tray or bubble deck towers are not always adapted to provide the necessary absorption or scrubbing characteristics, being generally less suitable than packed towers for certain functional requirements. On the other hand, there are certain disadvantages in the use of packed towers. For example, there is a tendency for gaseous and liquid streams to channel through the packing especially with low liquid flow rates. There is also a disadvantage in the use of packed beds when there is any large quantity of entrained particles in either of the streams which can effect a rapid clogging of the packing within the tower.

In view of the foregoing disadvantages, there has come into commercial use apparatus and process means for using lightweight floating and moving beds of contact elements which can provide a surface for turbulence and mutual contact between countercurrent flowing streams. It may be noted that this floating bed type of operation and apparatus has been disclosed in A. W. Kielback United States Patent No. 3,122,594, entitled "Apparatus and Procedure for Contact Between Fluids." This patent teaches the use of light weight spherical balls of plastic or synthetic resins, although in some cases it is indicated that the spheres might be of thin light weight metal. In any event, the concept has utilized contact members with impervious walls as well as with a resulting low density in order to permit the gas stream to effect the turbulent lifting of the bed of contact elements upwardly against a superimposed grid plate.

In connection with the use of small spherical contact elements, it has been found that when operating under pressure there frequently occurs a leakage of liquid into some of the spheres thereby causing them to have a weight change and lose their ability to be floated as a part of the turbulent bed of elements. Still another disadvantage resides in the cost of fabrication. Even hollow plastic or resin types of material may have some form of seam in the fabrication of a sphere, while with metal spheres, and especially stainless steel, there is almost a prohibitive cost in effecting the production of a relatively small number of welded hollow sphere members.

It is thus a principal object of the present invention to provide for the use of light weight contact elements which are at least partially open. In other words, the improved forms of contact elements have sufficient wall opening or perforation to permit both liquid and gaseous streams to rapidly enter and leave their interiors so as to make use of additional internal contact surfaces without retaining sufficient liquid to unfavorably effect their weight or density.

In one instance, an improved operation may be obtained with the use of contact elements designed as half spheres with or without additional perforation. In other instances, contact members may be of a thin hollow spherical shape provided with a number of relatively large openings that will preclude the retention of any contact liquid in the interior thereof. The half spheres or the perforate hollow spheres will thus provide low density means for forming a floating contact bed, while at the same time providing an increase in the surface area available to the liquid and gaseous streams without any problem of leakage or retention of a large quantity of liquid. The contact elements may also be of a foam-like nature, where there is a rough surface and certain openings and internal voids extending below the surface of the element, to thus provide a light weight high surface area member.

In a broad aspect, the present invention in connection with the countercurrent contacting of gas and liquid streams within a confined contacting zone, where the gas stream flows upwardly and the liquid stream flows downwardly in such zone, while maintaining therein a floating and moving bed of light weight contact elements for the mutual contacting and dispersal of the gas and liquid streams, provides the improvement of using a given mass of formed elements in a manner which comprises, providing the latter has at least partially open elements that have a large surface area whereby they may be in a loose and mobile aerated bed and which contact elements thus provide both exterior and interior formed surfaces for contact with said countercurrently flowing streams.

It has been indicated hereinabove that the improved contact members shall be of a generally spherical form such as perforate spheres or half spheres, although, of course, there may be intermediate aspects where the elements are segments of spherical form members that are greater than a half sphere or somewhat less than a half sphere. A rounded or spherical form of member is, of course, of particular advantage in precluding the nesting or interlocking of elements when they are permitted to fall back to the support grid in a quiescent state. The elimination of nesting or interlocking of members thus permits such members to be readily aerated and floated when a contact unit is placed into operation. Sharp corners, which can wear or be subject to attrition, may be of disadvantage for the moving bed type of operation; however, the partially open formed elements or "spherical form" elements, as the term is used herein, may include polygonal shapes. In any event, it is not intended to limit the present improved operation and type of partially open contact element to the use of strictly spherical or hemispherical surfaces for, as will be hereinafter noted with reference to the drawings, there may be modifications in the edges of the half sphere to assist in avoiding the nesting of elements in either the turbulent or quiescent state. The elements may be formed of various types of materials, including but not limited to, polyolefins, polyurethanes, formed polystyrene, celluloid, hard rubbers, stainless steel, aluminum and wood or wood fibers, etc.

Reference to the accompanying drawings and the following description thereof will serve to further clarify the operation of the floating bed type of unit and improved forms of contact elements which may be used in connection therewith.

FIGURE 1 of the drawing is a diagrammatic sectional elevational view showing a contact chamber adapted to accommodate the countercurrent flow of gas and liquid streams in the presence of light weight open contact elements to provide turbulent floating bed contact between the two streams.

Figure 2:
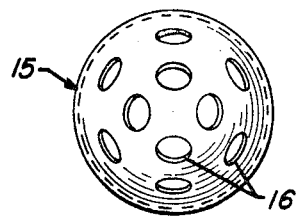

FIGURE 2 of the drawing indicates diagrammatically a modified form of contact element in the nature of a hollow sphere with relatively large wall perforations or openings.

Figure 3:
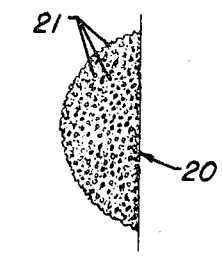

FIGURE 3 of the drawing shows diagrammatically an open surface sponge type of contact element which may be used in lieu of a smooth surface element.

Referring now particular to FIGURE 1 of the drawing, there is indicated a vertically disposed contact chamber 1 having gas inlet means 2 for introducing a gaseous stream which is to be scrubbed into the lower portion of the chamber. Scrubbed gas outlet means 3 is provided from the upper portion of the chamber above internal contacting zones 4 and 5, as well as above a packed mist extractor zone 6 within the upper portion of the chamber. Provision is made for the introduction of a suitable scrubbing liquid stream by way of line 7 and spray means 8. The latter is arranged to supply the scrubbing liquid over the entire area of the upper contacting zone 5, as well as perforate retaining plate 9, such that there may be substantially uniform downward flow of liquid through the floating bed of contact elements 10 in both the contact zones 4 and 5. Suitable intermediate perforate plates or grids 11 and 12 will serve to divide the central portion of the contact chamber 1 into a plural number of zones for effecting the turbulent contacting between the gaseous and liquid streams; however, it is not intended to limit the use of this type of contact tower and improved contact elements to any predetermined number of separate stages or contact zones. Each contacting stage, as, for example zone 4, shall have an upper perforate plate or grid member, such as 11, to provide a top limitation for the floating bed of elements as well as a lower perforate plate or grid member 12 that provides a support for the lightweight contact elements as they descend by gravity following a shutdown of the unit, or a temporary cessation of the gas stream flow. The lower portion of the contacting chamber 1 is provided with a liquid collection zone 13 and a liquid outlet nozzle 14 thereby collected particulate material and scrubbing liquid can be discharged from the scrubbing unit.

In the actual operation of the floating bed type of scrubbing unit, there shall be an adjustment between the gas and liquid flow rates, which in turn will be governed by the number of contacting stages, the number of elements in the unit and the like, such that there is a lifting of all of the contact elements from their respective lower support plate members and a resulting turbulence within the upper portion of each stage. Preferably, the gas flow rate is such as to lift all the contact elements against the upper perforate members of each zone while at the same time the liquid charge rate and supply means is such as to provide uniform downward flow through the zones 4 and 5 and effect the desired mutual contacting of liquid and gas on all the surfaces of the multiplicity of contact elements within the chamber.

As pointed out in the aforementioned Patent No. 3,122,594, this general type of floating bed scrubbing unit is especially designed to handle particulates which will foul a conventional type of column. For example, the gases may contain particles of alumina, tars, carbon and the like which it is desired to remove prior to the stream being discharged to the atmosphere. The liquid charge stream may be water, or in connection with special operations, an aqueous stream that may be slightly alkaline or acidic, depending upon the necessity for neutralizing collected material and liquid in the reservoir section of the chamber to in turn eliminate corrosion problems.

The mist extractor means 6 may comprise baffle plates, or alternatively, a particular type of mesh or packing material that is capable of coalescing entrained vapor and water droplets in the scrubbed gas discharge stream.

It should also be understood in connection with the present improved operation, utilizing the open form contact elements, that such operation should be controlled to avoid excessive gas flow or flooding. For example, if the gas velocity is permitted to be excessive in any given operation, there may be a situation where the liquid no longer tends to flow downwardly through the bed. In such case, the upper portion of the tower may tend to fill with the liquid being introduced by way of the spray nozzle means and the gas merely bubbles through the collected liquid without effecting the desired dispersed and intimate contact therewith. Also, where the region below a distributing grid of a contact stage becomes filled essentially with gas alone, there is tendency to lose the uniform floating bed action by the upward flow of the gas stream and the contact elements tend to fall to the lower grid of each stage while the stream bypasses them. In a preferred flow, the adjustment of gas and liquid flow rates permits the moving turbulent action of each of the contact elements against an upper retaining grid member for each contact zone and there is a mutual interchange and contacting of gas and liquid streams over the surfaces of each contact element. The wetted elements assists in agglomerating and holding entrained particulates so that they are removed from the gas stream being scrubbed while at the same time there is a constant washing away of accumulated particulate material such that the particles carry downwardly through the scrubbing chamber to successively lower zones and ultimately to the collecting reservoir 13 in the lower portion of the chamber where they are discharged therefrom with collected scrubbing liquid.

In a scrubbing operation of this type, with perforate internally open contact elements, there will be improved countercurrent contacting by virtue of the greater surface area, as well as the provision of contact beds which seem to provide greater bed resistance. Those persons familiar with the floating bed type of scrubber units have found by experiment as well as by experience that the efficiency of a tower in operation appears to correlate itself with bed resistance or flow resistance through the one or more beds maintained in the tower. Greater quantities of contact elements will provide a greater resistance and resulting greater efficiencies of contact for carrying out the scrubbing operation. In addition, a tower with one or more contacting zones can be designed and operated to function as a countercurrent liquid-gas stream contacting zone in various manners with respect to the type of turbulence maintained therein. More specifically, the unit may utilize flow rates therethrough where a concentration of low density contact elements is maintained in constant agitation as a relatively compact floating bed and carried to the upper portion of each stage or zone and against the upper limiting grid plates. In another manner of operation, there may be a more turbulent type of contact with a diminished concentration of elements permitting increased throughput of liquid and gas. As a result, smaller diameter towers may be employed for a given scrubbing or reaction problem. In the latter type of operations there may be chemical reactions, heat exchange operations or gas absorption at low pressure drop conditions, concentration of solutions, rectification of liquids, etc.

In FIGURE 2 of the drawing, there is indicated diagrammatically a hollow sphere 15 which is designed and fabricated to have relatively large holes or openings 16 through its wall surface. The openings shall be of sufficient size as to permit free flow of the gas and liquid streams into the interior of the hollow member whereby there may be utilization of the entire interior surface. Also, as noted hereinbefore, the openings of an element shall be sufficiently large as to preclude the entrapment of any amount of liquid material which could add to the weight thereof and then raise the density of the individual contact member to a sufficient degree that would harm its being aerated and elevated as an element of the floating bed in the contacting unit. In an alternative construction, the spherical member 15 may have a segment of the outer wall surface removed such that there is less than a whole sphere as well as perforations through the remaining portion of the thin wall member. The plurality of elements may be constructed or formed of metals or of plastic and resin types of material. A uniform size and type of element may be used in any given contact zone to obtain a uniform floating bed action, with relatively thin wall surfaces utilized so as to retain a relatively low weight or density per element; however, at times, there may be an advantage to using varying sizes in one zone. The elements will generally have a diameter in the range of 1-inch to 2½-inches. On the other hand, in a turbulent bed contacting zone, there may be utilized formed elements of different densities whereby some of them tend to have random movement in the upper part of the contact zone while others of slightly greater density, or with some liquid absorption, will maintain a random movement in the lower portion of the contact zone.

FIGURE 3 of the drawing shows, in a diagrammatic or illustrative manner, a formed element 20, with openings 21, which has a porous, pitted or foam-like surface to give added surface area thereto and at the same time be of a light weight construction or formation. Although not shown in the drawing, this modified type of surface can also be made and utilized in connection with solid and hollow hemispherical forms of elements, or at least provide elements that are less than whole spheres. Actually, where the foam-like surface does not provide continuous channels to the interior of the element, it may be of a uniform nature; however, where the material is of a highly absorptive nature, then it should be open on the interior and have suitable openings, such as with the design of FIGURE 2. These hollow sphere or hemisphere designs insure that there is no appreciable retention of liquid and prevention of movement by aeration. Also, various types of materials may, of course, be used with this form of element, including but not limited to, polyolefins, polyurethanes, foamed polystyrene, celluloid, rubber, etc. In contacting operations utilizing the elements in a turbulent random motion, there may be an advantage to using different density elements such that part of them will tend to circulate in the upper part of the aerated bed and a portion within the lower part of the bed. Thus, elements with a foam-like or porous absorptive surface could be used in combination with light weight smooth surface elements.

We claim as our invention:

1. In the countercurrent contacting of gas and liquid streams in a confined contacting zone, with the gas stream flowing upwardly in such contacting zone while maintaining therein a moving bed of light weight contact elements fluidized by said gas for the mutual contacting and dispersal of the gas and liquid streams, the improved method of effecting the countercurrent contacting of such streams with a given mass of formed contact elements, which comprises providing at least a portion of said formed elements in open walled spherical form having a large surface area and relatively low density whereby they may be lifted and fluidized in a loose and mobile aerated bed, and which contact elements have large wall openings of sufficient size to permit free flow of gas and liquid into and out of said contact elements and to thus provide both exterior and interior surfaces for free contact with said countercurrently flowing streams of gas and liquid.

2. The countercurrent contacting operation of claim 1 further characterized in that said open walled spherical form elements are hollow spheres with large wall openings to provide free and rapid flow of gas and liquid in and out of such elements.

3. The countercurrent contacting operation of claim 1 still further characterized in that said spherical form elements have a high surface area foam-like surface.

References Cited

UNITED STATES PATENTS

| 2,212,932 | 8/1940 | Fairlie | 261—94 |
| 3,122,594 | 2/1964 | Kielback | 55—91 X |
| 3,302,372 | 2/1967 | Hynson et al. | 55—91 X |
| 3,350,075 | 10/1967 | Douglas | 55—91 X |

REUBEN FRIEDMAN, *Primary Examiner.*

R. W. BURKS, *Assistant Examiner.*